May 12, 1953  C. E. FERGUSON ET AL  2,638,043
GROUND WORKING MACHINE
Filed June 1, 1950  3 Sheets-Sheet 1

INVENTOR.
Carl E. Ferguson
Kendall Ferguson
Robert Claire Ferguson
BY
ATTORNEY.

May 12, 1953 C. E. FERGUSON ET AL 2,638,043
GROUND WORKING MACHINE
Filed June 1, 1950 3 Sheets-Sheet 2
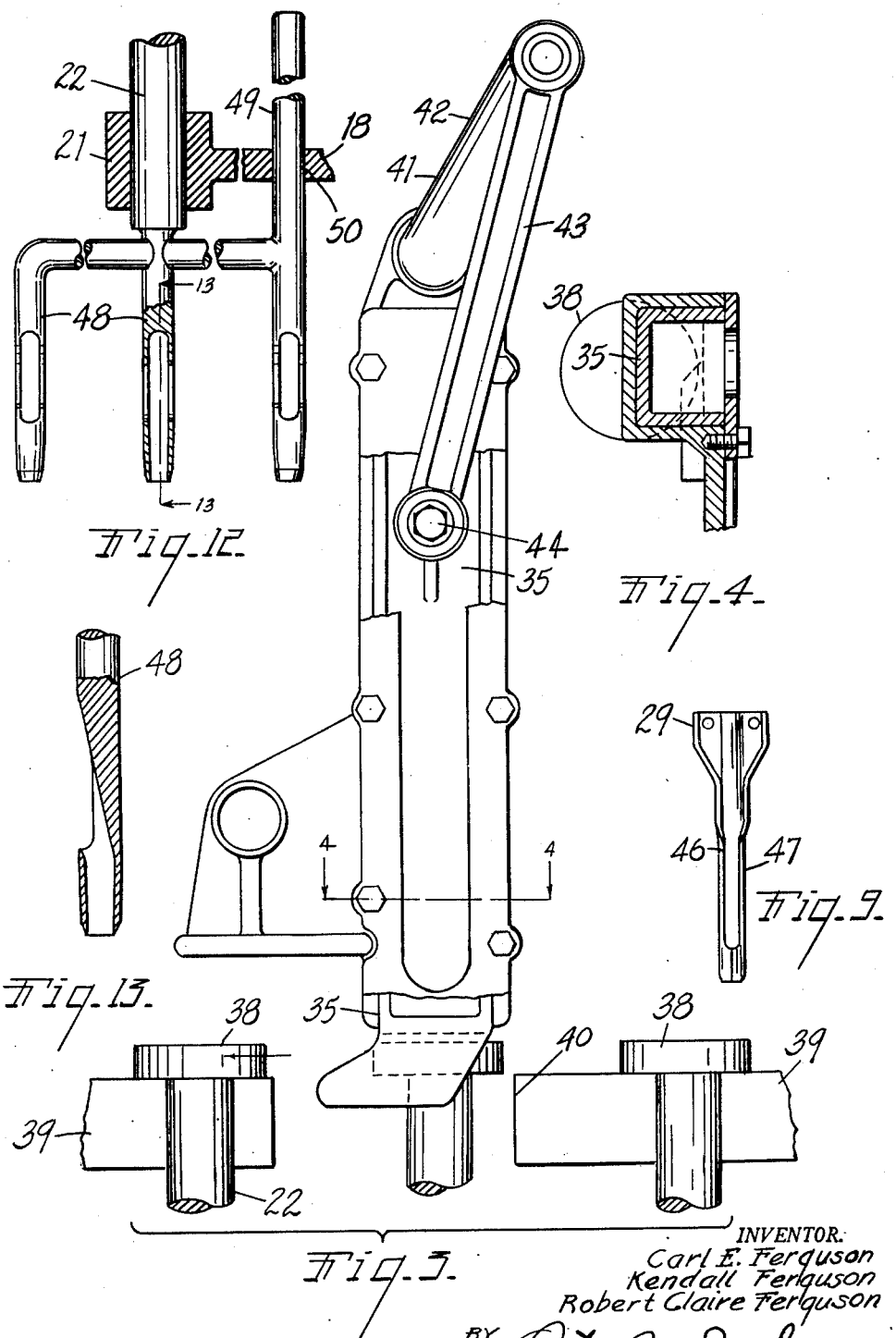
INVENTOR.
Carl E. Ferguson
Kendall Ferguson
Robert Claire Ferguson
BY
ATTORNEY.

May 12, 1953  C. E. FERGUSON ET AL  2,638,043
GROUND WORKING MACHINE
Filed June 1, 1950  3 Sheets-Sheet 3
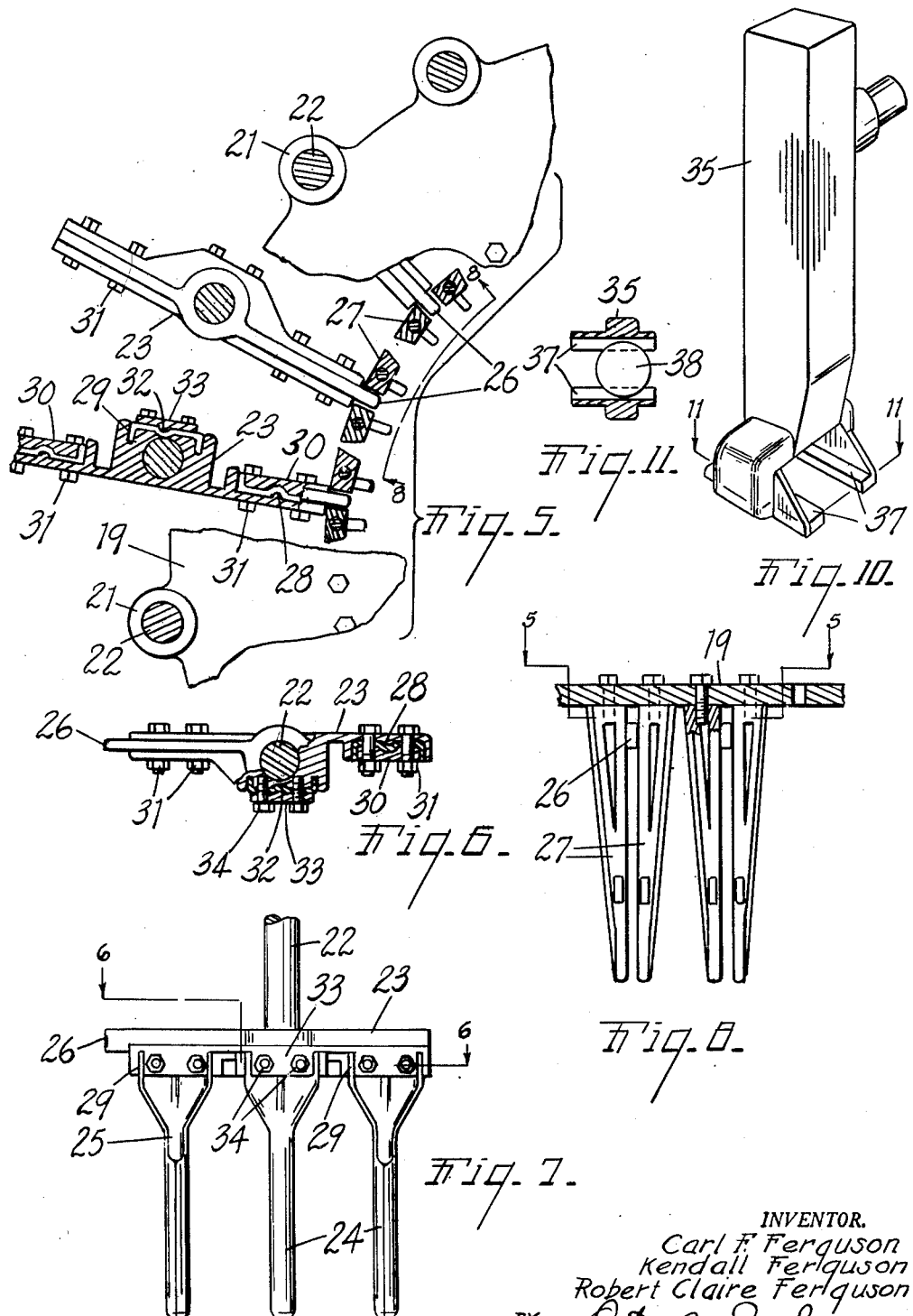
INVENTOR.
Carl F. Ferguson
Kendall Ferguson
Robert Claire Ferguson
BY
ATTORNEY.

Patented May 12, 1953

2,638,043

UNITED STATES PATENT OFFICE 2,638,043

GROUND WORKING MACHINE

Carl E. Ferguson, Kendall Ferguson, and Robert Claire Ferguson, Eau Claire, Mich., assignors to Berrien Tool and Die Company, Eau Claire, Mich., a corporation of Michigan Application June 1, 1950, Serial No. 165,482

17 Claims. (Cl. 97—44)

This invention relates to improvements in a ground working machine.

The main objects of this invention are:

First, to provide a ground working machine which is well adapted for use in working sod surfaces such as the greens of golf courses, lawns and the like to ventilate or aerate the same.

Second, to provide a machine of this character in which the ground is pierced to provide substantially uniformly spaced holes therein, to aerate and to permit effective application of water and fertilizer.

Third, to provide a machine of the character described which is entirely automatic in operation and of large capacity.

Objects relating to details and economies of the invention will appear from the description to follow. The invention is pointed out in the claims.

A preferred embodiment of the invention is illustrated in the accompanying drawings, in which:

Fig. 3 is an enlarged fragmentary view looking from the left of Fig. 1 illustrating the relationship of the tool actuating plunger to the tool support.

Fig. 4 is a fragmentary sectional view corresponding to line 4—4 of Fig. 3.

Fig. 5 is an enlarged fragmentary view on a line corresponding to the broken line 5—5 of Fig. 8.

Fig. 6 is a fragmentary view of one of the tool crossheads taken on a line corresponding to the broken line 6—6 of Fig. 7.

Fig. 7 is a fragmentary side elevational view of one of the tools.

Fig. 8 is an enlarged fragmentary view on a line corresponding to line 8—8 of Fig. 5 showing details of the tool guides.

Fig. 9 is a side elevational view of a desirable form of tool prong.

Fig. 10 is a perspective view of a modified form of the tool actuating plunger.

Fig. 11 is a sectional view of the jaw portion of the plunger on a line corresponding to the broken line 11—11 of Fig. 10, one of the tool supporting heads being illustrated in engaged position.

Fig. 12 is a fragmentary view partially in section of a modified form of the tool.

Fig. 13 is a fragmentary view partially in vertical section showing details of one of the prongs of the embodiment of Fig. 12.

Figures 1, 2, 2A:
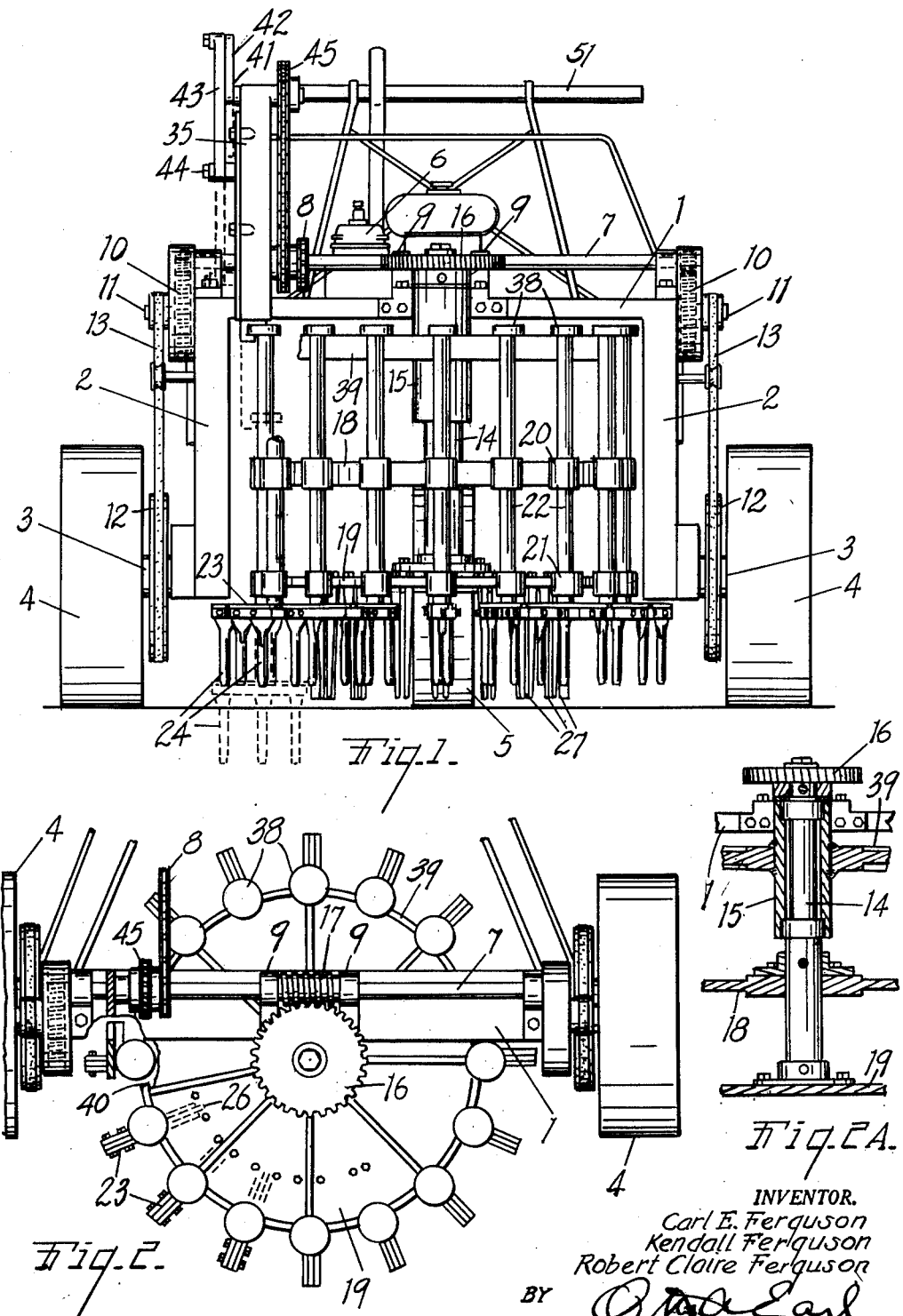
Fig. 1 is a front elevational view of the machine embodying our invention, one tool being shown in actuated position by dotted lines.
Fig. 2 is a fragmentary plan view, certain of the concealed parts in this view being indicated by dotted lines.
Fig. 2A is a view partially in vertical section illustrating details of the mounting of the tool turret.

The embodiment of our invention illustrated in the accompanying drawing comprises a yoke-like frame 1, the downward projecting arms 2 of which are provided with spindles 3 for the carrying and traction wheels 4. The third steering wheel 5 is provided but the details of mounting and manipulation of this wheel are not illustrated as they form no part of this invention.

The machine is powered by an engine indicated at 6 which is connected to the driving shaft 7 by means of the transmission chain 8. The driving shaft is mounted on the top of the yoke-like frame, bearings 9 being provided therefor. The reducing gearings indicated at 10 drive stub shafts 11 which are connected to the pulleys 12 on the wheel spindles 3 by means of belts 13. The multiple tool turret unit comprises the vertical shaft 14 mounted in suitable bearings 15 on the frame and provided with a worm gear 16 on its upper end coacting with the worm 17 on the driving shaft.

The turret unit also comprises vertically spaced supports 18 and 19 which are keyed to the shaft and provided with vertically aligned bearings 20 and 21. These bearings reciprocatingly support the shanks 22 of the tools. The shanks 22 have prong crossheads 23 on their lower ends to which the prongs 24 are secured. These prongs are desirably formed as sheet metal stampings and they are tubular, having lateral discharge openings 25 in spaced relation to their lower ends. The crossheads 23 are provided with guide lugs 26 which reciprocate between the laterally spaced vertical guide members 27 which are secured to the lower bearing member support 19 (see Figs. 5 and 8).

The crossheads 23 are preferably provided with seats 28 for the channel shaped attaching ends 29 of the prongs 24, the prongs being clamped in these seats by the clamp members 30 secured by the bolts 31. The seats 32 of the crossheads are shaped to receive the prongs in reverse position as shown in Fig. 6, the clamp member 33 being secured by lag screws 34. With the parts thus arranged the tool crossheads are retained in radial relation as the turret revolves. In their retracted position the tools clear the surface over which the machine travels.

The plunger 35 is provided with spaced jaws 37 at its lower end adapted to receive the shanks of the tools between them with the disc-like shank heads 38 of the tools above the jaws as is shown in Fig. 11. The tools are supported in their retracted position by means of the annular support 39 which supportingly engages the heads. This support has an opening 40 at one side through which the plunger reciprocates to strike the shank heads and drive the prongs into the soil, the jaws of the plunger withdrawing the tools from the soil and returning them to initial position so that their shank heads pass onto the support member 39 and slide thereon to complete their cycle of movement. The plunger is driven by means of the crankshaft 41 having a crank 42 thereon connected by the connecting rod 43 to the pin 44 on the plunger. The crankshaft 41 is connected by the sprocket chain 45 to the driving shaft so that the plunger is actuated in timed relation to the rotation of the turret.

The opening 40 in the tool supporting member 39 of the turret is of such length as to permit a full stroke of the plunger while a tool is engaged thereby. The result is that the multiple prong tools are successively actuated to drive the prongs of the tools into the soil and to retract them. The plugs of soil cut from the ground by the prongs are successively discharged from the side openings in the prongs.

The driving connections 16 and 17 to the turret, and the gearings 10 to the traction wheels 4 are arranged to rotate the turret and the traction wheels in timed relationship so that the peripheral speed of the tool shanks 22 is approximately equal to the peripheral speed of the traction wheels 4, and therefore the speed of advance of the carriage. The direction of rotation of the turret is clockwise as viewed in Fig. 2 so that the tool actuating plunger 35 is positioned along the retreating side of the turret with respect to the direction of advance of the machine. Since the peripheral speed of the tool shanks is approximately equal to the ground speed of the machine, and opposite thereto on the retreating side of the turret, the speed of the tool shank engaged with the actuating plunger will be approximately zero with respect to the ground during the time that the plunger and engaged tool are reciprocated. The actuated tool will therefore move downwardly into the ground and then upwardly with little or no horizontal movement relative to the ground, and there is no force tending to bend the prongs or tear the turf.

In the modification shown in Fig. 9, the side openings 46 extend well toward the bottom of the prong 47 otherwise the prong is the same as that illustrated in Fig. 7. The prong 47 clears somewhat more readily than the prong 24. In the embodiment shown in Fig. 12 the prongs 48 are formed as castings and are secured in the lower end of the shank 22. In this embodiment the tools are provided with upwardly projecting guide rods 49 reciprocating in guide holes 50 provided therefor in the lower bearing support 18.

In operation the machine illustrated is hand guided, the handle being indicated at 51. The machine treats a strip of uniform width. In treating greens of golf courses the preferred practice is to sweep up the "plugs" but in treating lawns that is not necessary. The machine of our invention is highly efficient and of large capacity. With the applicants' commercial embodiment illustrated it is practical to treat about 2,000 sq. ft. per hour.

We have illustrated and described our invention in a highly practical commercial embodiment thereof. We have not attempted to illustrate or describe other embodiments or adaptations as it is believed that this disclosure will enable those skilled in the art to embody or adapt our invention as may be desired.

Having thus described our invention, what we claim as new and desire to secure by Letters Patent is:

1. In a ground working machine, the combination of a carriage comprising a yoke-like frame provided with outwardly projecting traction wheel spindles on its arms, traction wheels on said spindles, a transversely disposed driving shaft on said frame having driving connections to said traction wheels, a turret including a turret shaft disposed vertically between the arms of said frame and having driving connection to said driving shaft, vertically spaced bearing support members on said turret shaft each having an annular series of angularly spaced bearings, the corresponding bearings of the series being vertically aligned, multiple prong tools having shanks slidable in said aligned bearings, said driving connections to said wheels and to said turret shaft being such that the peripheral speed of said wheels approximately equals the peripheral speed of said tools, the tools comprising crossheads on said shanks on which the prongs are mounted in spaced relation, the prongs having tubular tips and side discharge openings above said tubular tips, the crossheads having guides slidably engaging guide members on one of the bearing support members to maintain the tool crossheads in radially extending relation on the turret, said shanks having disc-like supporting heads at their upper ends, an annular tool support disposed above said bearing members to engage and slidably support the heads of the tool shanks as the turret revolves, a vertically reciprocating plunger disposed at one side of said turret and recessed to successively receive the tool shank heads as the turret revolves, said support having an opening therein along the retreating side of said turret relative to the advancing motion of said carriage through which said plunger reciprocates, and means for actuating said plunger to successively actuate the tools, the plunger acting in its returned position to guide the actuated tool onto said tool support.

2. In a ground working machine, the combination of a carriage having a frame, a turret including a turret shaft disposed vertically on said frame, vertically spaced bearing support members on said turret shaft each having an annular series of angularly spaced bearings, the corresponding bearings of the series being vertically aligned, multiple prong tools having shanks slidable in said aligned bearings, the tools comprising crossheads on said shanks on which the prongs are mounted in spaced relation, the prongs having tubular tips and side discharge openings above said tubular tips, the crossheads having guides slidably engaging guide members on one of the bearing support members to maintain the tool crossheads in radially extending relation on the turret, said shanks having disc-like supporting heads at their upper ends, an annular tool support disposed above said bearing support members to engage and slidably support the heads of the tool shanks as the turret revolves, means for driving said carriage and for rotating said turret and said tools at approximately the same peripheral speed as the speed of said carriage, a vertically reciprocating plunger disposed at one side of said turret and recessed to successively receive the tool shank heads as the turret revolves, said support having an opening therein along the retreating side of said turret relative to the advancing motion of said carriage through which said plunger reciprocates, and means for actuating said plunger to successively actuate the tools, the plunger acting in its returned position to guide the actuated tool onto said tool support.

3. In a ground working machine, the combination of a carriage comprising a yoke-like frame provided with outwardly projecting traction wheel spindles on its arms, traction wheels on said spindles, a transversely disposed driving shaft on said frame having driving connections to said traction wheels, a turret including a turret shaft disposed vertically between the arms of said frame and having driving connection to said driving shaft, vertically spaced bearing support members on said turret shaft each having an annular series of angularly spaced bearings, the corresponding bearings of the series being vertically aligned, multiple prong tools having shanks slidable in said aligned bearings, said driving connections to said wheels and to said turret shaft being such that the peripheral speed of said wheels approximately equals the peripheral speed of said tools, the tools comprising crossheads on said shanks on which the prongs are mounted in spaced relation, the prongs having tubular tips and side discharge openings above said tubular tips, coacting guide members on said crossheads and said turret, said shanks having disc-like supporting heads at their upper ends, an annular tool support disposed above said bearing support members to engage and slidably support the heads of the tool shanks as the turret revolves, a vertically reciprocating plunger disposed at one side of said turret and recessed to successively receive the tool shank heads as the turret revolves, said support having an opening therein along the retreating side of said turret relative to the advancing motion of said carriage through which said plunger reciprocates, and means for actuating said plunger to successively actuate the tools, the plunger acting in its returned position to guide the actuated tool onto said tool support.

4. In a ground working machine, the combination of a carriage having a frame, a turret including a turret shaft disposed vertically on said frame, vertically spaced bearing support members on said turret shaft each having an annular series of angularly spaced bearings, the corresponding bearings of the series being vertically aligned, multiple prong tools having shanks slidable in said aligned bearings, the tools comprising crossheads on said shanks on which the prongs are mounted in spaced relation, the prongs having tubular tips and discharge openings above said tubular tips, coacting guide members on said crossheads and said turret, said shanks having disc-like supporting heads at their upper ends, an annular tool support disposed above said bearing support members to engage and slidably support the heads of the tool shanks as the turret revolves, means for driving said carriage and for rotating said turret and said tools at approximately the same peripheral speed as the speed of said carriage, a vertically reciprocating plunger disposed at one side of said turret and recessed to successively receive the tool shank heads as the turret revolves, said support having an opening therein along the retreating side of said turret relative to the advancing motion of said carriage through which said plunger reciprocates, and means for actuating said plunger to successively actuate the tools, the plunger acting in its returned position to guide the actuated tool onto said tool support.

5. In a ground working machine, the combination of a carriage comprising a yoke-like frame provided with outwardly projecting traction wheel spindles on its arms, traction wheels on said spindles, a transversely disposed driving shaft on said frame having driving connections to said traction wheels, a turret mounted for rotation on a vertical axis between the arms of said frame and having driving connection to said driving shaft and an annular series of angularly spaced vertically extending bearings, multiple prong tools having shanks slidably supported in said bearings, the tools and turret having coacting guide means for maintaining the tools in radially extending relation on the turret, said shanks having disc-like supporting heads at their upper ends, an annular support with which said tool heads are slidably engaged in retracted position as the turret revolves, a vertically reciprocating plunger disposed at one side of said turret to successively engage the tool shank heads as the turret revolves, said driving connections being such that said wheels rotate at approximately the same peripheral speed as said turret and said tools, said support having an opening therein along the retreating side of said turret relative to the advancing motion of said carriage through which said plunger reciprocates, and means for actuating said plunger to successively actuate the tools, the plunger acting in its returned position to guide the actuated tool onto said support.

6. In a ground working machine, the combination of a carriage comprising a yoke-like frame provided with outwardly projecting traction wheel spindles on its arms, traction wheels on said spindles, a transversely disposed driving shaft on said frame having driving connections to said traction wheels, a turret mounted for rotation on a vertical axis between the arms of said frame and having driving connection to said driving shaft and an annular series of angularly spaced vertically extending bearings, multiple prong tools having shanks slidably supported in said bearings, said shanks having disc-like supporting heads at their upper ends, an annular support with which said tools are slidably engaged in retracted position as the turret revolves, said driving connections being such that said wheels rotate at approximately the same peripheral speed as said turret and said tools, a vertically reciprocating plunger disposed along the retreating side of said turret relative to the path of movement of said carriage to successively engage the tool shank heads as the turret revolves, and means for actuating said plunger to successively actuate the tools, the plunger acting in its returned position to guide the actuated tool onto said tool support.

7. In a ground working machine, the combination of a carriage, a turret including a turret shaft, vertically spaced bearing support members on said turret shaft each having an annular series of angularly spaced vertically extending bearings, the corresponding bearings of the series being vertically aligned, multiple prong tools having shanks slidable in said aligned bearings, the tools comprising crossheads on said shanks on which the prongs are mounted in spaced relation, the crossheads and one of the bearing support members having coacting guides acting to maintain the tool crossheads in radially extending relation on the turret, said shanks having supporting heads at their upper ends, an annular tool support disposed above said bearing support members to engage and slidably support the heads of the tool shanks as the turret revolves, means for driving said carriage and for rotating said turret and said tools at approximately the same peripheral speed as the speed of said carriage, a vertically reciprocating plunger disposed along the retreating side of said turret relative to the path of movement of said carriage to successively receive the tool shank heads as the turret revolves, and means for actuating said plunger to successively actuate the tools, the plunger acting in its returned position to guide the actuated tool onto said tool support.

8. In a ground working machine, the combination of a carriage, a turret including a turret shaft, vertically spaced bearing support members on said turret shaft each having an annular series of angularly spaced vertically extending bearings, the corresponding bearings of the series being vertically aligned, multiple prong tools having shanks slidable in said aligned bearings, said shanks having supporting heads at their upper ends, an annular tool support disposed above said bearing support members to engage and slidably support the heads of the tool shanks as the turret revolves, means for driving said carriage and for rotating said turret and said tools at approximately the same peripheral speed as the speed of said carriage, a vertically reciprocating plunger disposed along the retreating side of said turret relative to the path of movement of said carriage to successively receive the tool shank heads as the turret revolves, and means for actuating said plunger to successively actuate the tools, the plunger acting in its returned position to guide the actuated tool onto said tool support.

9. In a ground working machine, the combination of a carriage, a turret including a turret shaft, vertically spaced bearing support members on said turret shaft each having an annular series of angularly spaced vertically extending bearings, the corresponding bearings of the series being vertically aligned, multiple prong tools having shanks slidable in said aligned bearings and the tools comprising crossheads on said shanks on which the prongs are mounted in spaced relation, the crossheads and one of the bearing support members having coacting guides acting to maintain the tool crossheads in radially extending relation on the turret, an annular tool support disposed to engage and slidably support the shanks of the tools as the turret revolves, means for driving said carriage and for rotating said turret and said tools at approximately the same peripheral speed as the speed of said carriage, a vertically reciprocating plunger disposed along the retreating side of said turret relative to the path of advance of said carriage to successively engage tool shanks as the turret revolves, and means for actuating said plunger to successively actuate the tools.

10. In a ground working machine, the combination of a carriage, a turret including a turret shaft, vertically spaced bearing support members on said turret shaft each having an annular series of angularly spaced vertically extending bearings, the corresponding bearings of the series being vertically aligned, multiple prong tools having shanks slidable in said aligned bearings, an annular tool support disposed to engage and slidably support the shanks of the tools as the turret revolves, means for driving said carriage and for rotating said turret and said tools at approximately the same peripheral speed as the speed of said carriage, a vertically reciprocating plunger disposed along the retreating side of said turret relative to the path of advance of said carriage to successively engage tool shanks as the turret revolves, and means for actuating said plunger to successively actuate the tools.

11. In a ground working machine, the combination with a carriage, of a turret mounted thereon for rotation on a vertical axis, means for driving said turret as the carriage is advanced, an annular series of multiple prong tools mounted on said turret for independent vertical reciprocation, the prongs of the tools being aligned and having tubular tips and side discharge openings above said tubular tips, means for maintaining the tools with their prongs in radially aligned relation as the turret revolves and as the tools are reciprocated, said turret driving means being operative to rotate said tools at a peripheral speed approximately equal to the speed of advance of said carriage, means for successively actuating said tools comprising a uniform stroke power actuated plunger disposed along the retreating side of said turret relative to the direction of advance of said carriage whereby the prongs are forced into the ground to a predetermined depth, and a support for maintaining the tools in retracted position, the tools being automatically picked up and transferred from the plunger to the support by rotation of the turret when the plunger is at the end of its retracting stroke and a succeeding tool presented thereto.

12. In a ground working machine, the combination with a carriage, of a turret mounted thereon for rotation on a vertical axis, means for driving said turret as the carriage is advanced, an annular series of multiple prong tools mounted on said turret for independent vertical reciprocation, the prongs of the tools having tubular tips and discharge openings above said tubular tips, said turret driving means being operative to rotate said tools at a peripheral speed approximately equal to the speed of advance of said carriage, means for successively actuating said tools comprising a uniform stroke power actuated plunger disposed along the retreating side of said turret relative to the direction of advance of said carriage whereby the prongs are forced into the ground to a predetermined depth, and a support for maintaining the tools in retracted position, the tools being automatically picked up and transferred from the plunger to the support by rotation of the turret when the plunger is at the end of its retracting stroke and a succeeding tool presented thereto.

13. In a ground working machine the combination with a carriage, of a turret mounted thereon for rotation on a vertical axis, means for driving said turret as the carriage is advanced, an annular series of multiple prong tools mounted on said turret for independent vertical reciprocation, the prongs of the tools being aligned and having tubular tips and discharge openings above said tubular tips, means for maintaining the tools with their prongs in radially aligned relation as the turret revolves and as the tools are reciprocated, said turret driving means being operative to rotate said tools at a peripheral speed approximately equal to the speed of advance of said carriage, means for successively reciprocating said tools at a position along the retreating side of said turret relative to the direction of advance of said carriage, and a support for maintaining the tools in retracted position when rotated out of registry with said reciprocating means, the tools being automatically picked up and transferred from the reciprocating means to the support by rotation of the turret when the reciprocating means is at the end of its retracting stroke and a succeeding tool is presented thereto.

14. In a ground working machine, the combination with a carriage, of a turret mounted thereon for rotation on a vertical axis, means for driving said turret as the carriage is advanced, an annular series of multiple prong tools mounted on said turret for independent vertical reciprocation, the prongs of the tools having tubular tips and discharge openings above said tubular tips, said turret driving means being operative to rotate said tools at a peripheral speed approximately equal to the speed of advance of said carriage, means for successively reciprocating said tools at a position along the retreating side of said turret relative to the direction of advance of said carriage, and a support for maintaining the tools in retracted position when rotated out of registry with said reciprocating means, the tools being automatically picked up and transferred from the reciprocating means to the support by rotation of the turret when the reciprocating means is at the end of its retracting stroke.

15. In a ground working machine, the combination with a carriage, of a turret mounted thereon for rotation on a vertical axis, means for driving said turret as the carriage is advanced, an annular series of multiple prong tools mounted on said turret for independent vertical reciprocation, means for maintaining the tools with their prongs in radially aligned relation as the turret revolves and as the tools are reciprocated, said turret driving means being operative to rotate said tools at a peripheral speed approximately equal to the speed of advance of said carriage, and means for successively reciprocating said tools at a position along the retreating side of said turret relative to the direction of advance of said carriage comprising a uniform stroke power actuated plunger whereby the prongs are forced into the ground to a predetermined depth.

16. In a ground working machine, the combination with a carriage, of a turret mounted thereon for rotation on a vertical axis, means for driving said turret as the carriage is advanced, an annular series of multiple prong tools mounted on said turret for independent vertical reciprocation, said turret driving means being operative to rotate said tools at a peripheral speed approximately squal to the speed of advance of said carriage, and means located along the retreating side of said turret relative to the line of advance of said carriage for successively actuating said tools comprising a uniform stroke power actuated plunger whereby the prongs are forced into the ground to a predetermined depth.

17. In a ground working machine, the combination with a carriage, of a turret mounted thereon for rotation on a vertical axis, means for driving said turret as the carriage is advanced, an annular series of multiple prong tools mounted on said turret for independent vertical reciprocation, said turret driving means being operative to rotate said tools at a peripheral speed approximately equal to the speed of advance of said carriage, the prongs of the tools having tubular tips and discharge openings above said tubular tips, and means located along the retreating side of said turret relative to the line of advance of said carriage for successively actuating said tools.

CARL E. FERGUSON.
KENDALL FERGUSON
ROBERT CLAIRE FERGUSON.

No references cited.